United States Patent Office 3,322,737
Patented May 30, 1967

3,322,737
PREPARATION OF WATER-RESISTANT POLYMERS EMPLOYING SULFONIUM SALTS
Donald A. Kangas, Midland, Mich., assignor to The Dow Chemical Company, Midland, Mich., a corporation of Delaware
No Drawing. Filed Jan. 2, 1964, Ser. No. 335,362
7 Claims. (Cl. 260—83.7)

This invention concerns an improved process and composition for aqueous emulsion polymerization of polymerizable ethylenically unsaturated compounds to obtain stable aqueous colloidal dispersions of polymers. It particularly concerns (a) the preparation of stable aqueous colloidal dispersions of polymeric products with one or more water-soluble sulfonium salts as the dispersion stabilizer, (b) the aqueous dispersions thus prepared, and (c) the water-resistant products obtained from such colloidal dispersions.

In the well known art of emulsion polymerization, a monomeric, usually water-insoluble, liquid composition comprising a polymerizable, ethylenically unsaturated compound, such as styrene, butadiene, methyl methacrylate, ethyl acrylate, vinyl acetate, vinyl chloride, or vinylidene chloride, or certain mixtures thereof, is colloidally emulsified in an aqueous medium that usually contains a wetting agent or surfactant, such as a water-soluble alkali soap, and a polymerization catalyst such as potassium persulfate. The resulting colloidal emulsion is then subjected to conditions conducive to polymerization of the monomeric constituents to produce an aqueous colloidal dispersion of the corresponding polymeric product, the aqueous colloidal dispersion being commonly called a latex.

The stability of the resulting polymer latex (aqueous colloidal dispersion) against coagulation or precipitation of its polymer ingredient depends at least in part upon the kind and amount of surfactants and the like that are contained in the aqueous suspending medium. It has been recognized in the prior art that the emulsifiers required in preparing latexes contribute to certain problems occurring in the end use of the latexes such as decreased water resistance and lack of clarity in the dried polymer therefrom. Accordingly, numerous efforts have been made to prepare stable latexes which are emulsifier-free with some measure of success. However, such emulsifier-free latexes then have other deficiencies such as large particle sizes or lack of mechanical stability and often the processes require large amounts of catalysts, or require excessively long periods for preparation. One of the reasons for water absorption by dried films, for example, which are prepared from latexes—although the polymer contained in the latex by itself may be quite hydrophobic—is the presence of salts, emulsifiers and other hydrophilic materials which remain in the dried polymer film. The amount of hydrophilic materials which will ultimately be present in the dried latex product may be minimized by the choice of polymerization ingredients. However, some sort of surface active agent (either as an additive or formed in situ) is required to stabilize the aqueous colloidal system and such surface active agents are inherently hydrophilic. Any of such surfactants which remain unchanged as residues in the dried film cause the dried product to be water absorbent.

It is an object of this invention to provide a process, and compositions therefor, for aqueous emulsion polymerization whereby to obtain stable aqueous colloidal dispersions of solid polymeric materials.

A further object is to provide such a process, and compositions therefor, whereby to obtain stable polymer dispersions that contain no more than only very small proportions of water-soluble constituents.

Yet another object is to provide stable aqueous polymer dispersions which, when dried, yield water-resistant solid products.

Other objects and advantages of the invention will be evident in the following description.

The objects of this invention have been attained in an aqueous colloidal dispersion of a polymeric material in which the dispersion is stabilized by a water-soluble sulfonium salt and in dried articles and films prepared therefrom.

In one preferred embodiment, the water-soluble sulfonium salt functions as the stabilizer during emulsion polymerization at a pH of from about 2 to about 8 of ethylenically unsaturated monomers which are capable of undergoing addition polymerization to form water-insoluble polymers and also stabilizes the aqueous colloidal dispersion (commonly called a latex) which is formed as a result of the polymerization procedure. If desired, however, the emulsion polymerization step may be carried out using conventional ionic emulsifiers then, after polymerization, the major proportion of such emulsifiers may then be removed and replaced by the water-soluble sulfonium salts of this invention by using ion-exchange or dialysis techniques.

The stabilization provided by the water-soluble sulfonium salt is effective while the polymer dispersion is in the wet state. When the latex product is dried and is subsequently heated, the sulfonium salt which previously had been surface active, is converted to hydrophobic materials which no longer are sensitive to water.

Thus a dried polymeric composition which is water-resistant is obtained even though it may contain some residues from the sulfonium salt, since such residues no longer are surface active and do not contribute water sensitivity to the polymer.

Water-resistance, or water-resistant, as used in this specification refers not to decomposition of the product nor even to water solubility but to a higher degree of resistance to water. Lack of water-resistance is evident by the film or article taking on a cloudy appearance when immersed in water or when water is allowed to stand on the surface of the material. The degree of water absorption is also a facet of the water-resistance of the material. A polymeric material which does not absorb significant proportions of water and which does not become cloudy upon immersion in water for prolonged periods has a high degree of water-resistance.

The sulfonium salts which are used in the practice of this invention are water-soluble salts having the formula

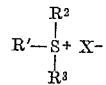

wherein R' is a monovalent hydrocarbon radical of from 8 to 20 carbon atoms having an aliphatic carbon atom bonded to the sulfur; i.e., an aliphatic radical such as an alkyl or an alicyclic radical, or an aralkyl group such as an alkyl-substituted benzyl radical, an alkenyl-substituted benzyl radical or other aliphatic group having an aromatic substituent; $R^2$ and $R^3$ are individually selected from the class consisting of alkyl groups having from 1 to 4 carbon atoms and monosubstituted alkyl groups of from 2 to 4 carbon atoms having a hydroxy substituent and a bond to the sulfur atom on different carbon atoms, e.g., 2-hydroxyethyl, 2-hydroxypropyl, 3-hydroxypropyl, 2-hydroxybutyl, 3-hydroxybutyl, and 4-hydroxybutyl; and $X^-$ is a water-soluble anion having a nucleophilicity at least as great as about the nucleophilicity of the sulfate ion, e.g., the methyl sulfate, sulfate, formate, acetate, chloride, bromide, and thiosulfate ions. The term "nucleophilicity" is used in the sense discussed in Hine, "Physical Organic Chemistry," McGraw Hill Book Co., Inc., N.Y., 1956, p. 138–142, in which source the equation and values obtained by Swain and Scott, J. Am. Chem. Soc., 75, 141 (1953) are quoted. For reaction in water, the equation of Swain and Scott is log $$\frac{k}{k_o} = sn$$

where $k$ is the second-order rate constant for a nucleophilic displacement by a reagent whose sensitivity to change in nucleophilicity is $s$ ($s$ is set 1.0 for the standard, methyl bromide) and $k_o$ is the second-order rate constant for nucleophilic attack by water. According to the equation and values of Swain and Scott, the minimum nucleophilicity require by $X^-$ to be effective in the practice of this invention is about 2.3. A simple test to determine whether $X^-$ has the requisite water solubility for use in the practice of this invention is to add to an aqueous solution containing about 1 percent by weight of dodecylethylmethylsulfonium methyl sulfate an aqueous solution of about an equimolar amount of an alkali metal salt of that anion, e.g., NaX or KX; if a precipitate or gel does not from then $X^-$ satisfies the requirements for water solubility for use in the practice of this invention.

Especially advantageous sulfonium compounds for use in the practice of this invention are dodecylethylmethylsulfonium chloride and dodecylethylmethylsulfonium methyl sulfate. However, numerous other sulfonium compounds, i.e., other salts within the scope of the above-described formula, may be used advantageously, such as ar-dodecylbenzyldiethanolsulfonium chloride, dodecylethylmethylsulfonium bromide, dodecylethylmethylsulfonium iodide, ar-dodecylbenzyldiethanolsulfonium bromide, dodecyldimethylsulfonium bromide, dodecyldiethylsulfonium iodide, butyldodecylethylsulfonium methyl sulfate, 2-ethylhexyldibutylsulfonium chloride, cetyldimethylsulfonium bromide, octadecyldiethylsulfonium methyl sulfate, eicosyldimethylsulfonium bromide, decyldi-n--propylsulfonium chloride, ar-dodecylbenzyldiethanolsulfonium formate, ar-dodecylbenzyldiethanolsulfonium acetate, ar-dodecylbenzyldiethanolsulfonium propionate, ar-dodecylbenzyldiethanolsulfonium butyrate, α-methyl--ar-dodecylbenzyldimethylsulfonium chloride, dodecylethylmethylsulfonium acetate, dodecylethylmethylsulfonium propionate, dodecyldiethylsulfonium formate, dodecyldiethylsulfonium butyrate, dodecylethylmethylsulfonium thiosulfate, dodecyldimethylsulfonium thiosulfate, cetyldimethylsulfonium thiosulfate, and the like.

The water-soluble sulfonium compounds described herein are prepared by the general methods for the preparation of chloro, bromo, iodo, or methyl sulfate sulfonium salts as described in Gilman, "Organic Chemistry," vol. I, 2nd ed., John Wiley & Sons, Inc., N.Y., 1943, p. 867–869. When sulfonium salts with other anions are desired, they are prepared by passing the corresponding $Cl^-$, $Br^-$, $I^-$, or $CH_3OSO_2O^-$ salt through an anion exchange resin which has been pre-treated with a sodium or potassium salt of the desired anion, $X^-$. Such substitution of anions preferably is accomplished before using the sulfonium compound as an emulsion stabilizer in the preparation of the latex but, if desired, the substitution may be carried out after the polymerization procedure.

It is thought that as long as the latex containing the sulfonium salt is in the wet state, e.g., as long as it is a latex, such sulfonium compound is present in the salt form. However, when the composition is dried, subsequent heating transforms the salt into non-hydrophilic (i.e., hydrophobic) materials according to the equation

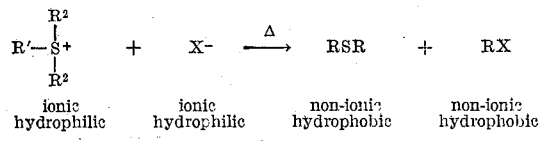

| $R'-\overset{R^2}{\underset{R^2}{S^+}}$ | $+$ | $X^-$ | $\xrightarrow{\Delta}$ | $RSR$ | $+$ | $RX$ | ionic hydrophilic    ionic hydrophilic    non-ionic hydrophobic    non-ionic hydrophobic In the foregoing equation R', $R^2$, and $R^3$ and $X^-$ have the same meaning as given hereinabove. As shown by the equation the products resulting from heating the sulfonium salt are RSR and RX, in which formulas each R corresponds to one of R', $R^2$ and $R^3$; i.e., one of R', $R^2$ or $R^3$ is combined with $X^-$ to form the non-ionic compound RX and the other two of R', $R^2$ and $R^3$ are combined non-ionically with sulfur to form the sulfide RSR. Often some, or most, of either RSR or RX will volatilize and escape during the heating which causes the decomposition of the sulfonium salt.

There are many known polymerizable ethylenically unsaturated compounds that can be polymerized while dispersed in aqueous media by means already known per se to produce aqueous colloidal dispersions of substantially water-insoluble solid polymer products. These can now be advantageously polymerized in aqueous dispersions that comprise small amounts of a water-soluble sulfonium salt in accordance with this invention.

Among such known polymerizable, non-ionic, ethylenically unsaturated monomers that are capable of undergoing addition polymerization at a pH of from about 2 to about 8 to form water-insoluble addition polymers are styrene and non-ionic monomers copolymerizable with styrene such as the alkenyl aromatic compounds, i.e., the styrene compounds; the derivatives of α-methylene monocarboxylic acids such as the acrylic esters, acrylic nitriles and methacrylic esters; derivatives of α,β-ethylenically unsaturated dicarboxylic acids such as maleic esters; unsaturated alcohol esters; conjugated dienes; unsaturated ketones; unsaturated ethers; and other vinyl compounds such as vinyl chloride and vinylidene bromide. Specific examples of such ethylenically unsaturated compounds are styrene, α-methylstyrene, ar-methylstyrene, ar-ethylstyrene, α,ar-dimethylstyrene, ar,ar-dimethylstyrene, vinylnaphthalene, hydroxystyrene, methoxystyrene, cyanostyrene, acetylstyrene, monochlorostyrene, dichlorostyrene and other halostyrenes, divinylbenzene, methyl methacrylate, ethyl acrylate, butyl, acrylate, hexyl acrylate, lauryl methacrylate, phenyl acrylate, β-chloroethyl acrylate, acrylonitrile, methacrylonitrile, ethyl α-choroacrylate, diethyl maleate, polyglycol maleate, dioctyl maleate, diethyl fumarate, fumaronitrile, maleonitrile, dioctyl itaconate, vinyl chloride, vinyl bromide, vinylidene chloride, isophopenyl acetate, vinyl benzoate, vinyl stearate, vinyl propionate, vinylidene bromide, vinyl methyl ketone, methyl isopropenyl ketone, vinyl ethyl ether, 1,3-butadiene, chloroprene, 2,3-dichloro-1,3-butadiene, 1-cyano-1,3-butadiene, isoprene and the like.

Especially valuable products are obtained when one or more of the above monomers is selected so that the homopolymer or copolymer prepared by the emulsion-polymerization procedure is film-forming below about 95° C.

One embodiment of this invention is an improved process of polymerization which comprises preparing an aqueous composition consisting essentially of from about 0.1 percent to about 10 percent, preferably from about 0.5 percent to about 5 percent, by weight of a water-soluble sulfonium salt, and one or more of the class of polymerizable, non-ionic, ethylenically unsaturated compounds that are capable of forming substantially water-insoluble addition polymers, the percentages being based on the total weight of the polymerizable material.

The invention contemplates that the aqueous starting composition comprising the polymerizable material may contain polymerization catalyst of kinds already known to promote emulsion polymerization. Among such catalysts are water-soluble oxidizing agents such as hydrogen peroxide and potassium persulfate and catalysts which, like the redox catalyst, are activated in the water phase, e.g., by a water-soluble reducing agent. Particularly advantageous and preferred catalyst systems are those which do not introduce significant quantities of hydrophilic materials. Such preferred catalyst systems include, for example;

the combination of hydrogen peroxide and ferric ions in an aqueous medium having a pH value of about 2–3, and the cumene hydroperoxide/sodium formaldehyde sulfoxylate catalyst system. The acceptable catalysts are those which cause polymeriztion of ethylenic monomers, e.g., styrene, in aqueous media having a pH value less than about 8. Other free-radical producing means, such as exposure of the composition to activating radiations, optionally may be employed rather than heat and/or catalytic compounds to activate the polymerization.

The starting composition may include mtaerials for adjusting the pH, e.g., acids, bases and buffers, but because of their contribution to water sensitivity in the polymer product, such additives are used in as small quantities as will produce the desired effect on the pH.

The other constituents of the starting composition can be employed in usual proportions already known in this art. For example, the starting aqueous composition usually contains from about 5 to about 60 percent by weight of the polymerizable constitutents and correspondingly from about 95 to about 40 percent by weight of the aqueous medium, although proportions outside of those ranges can be used.

The starting composition as described above is subjected to conditions conducive to polymerization of the polymerizable constitutents for a time sufficient to obtain a desired degree of conversion (usually nearly 100%) of monomer to polymer, generally from about 3 to about 24 hours. In most instances, the starting composition is agitated and the temperature is raised, e.g., to a temperature in the range from 30° to 80° C., to activate the polymerization, although in some instances, particularly those wherein the composition comprises a very active polymerization catalyst, the polymerization can occur at or below room temperature.

The invention contemplates embodiments in which all of the constitutents are charged to the starting mixture and are polymerized therein in a single step as well as embodiments in which the constitutents are charged in a sequence, perhaps coordinated with a polymerization sequence, and/or the polymerization is carried out in a series of stages.

In a preferred embodiment, i.e., when the emulsion polymerization stabilizer consists essentially of the sulfonium compound of the invention, the desired product—a stable colloidal dispersion of a water-insoluble polymer which may be dried to a water resistant product—is obtained directly. When the emulsion polymerization step is carried out using other ionic emulsifiers, then by means of dialysis or ion exchange at least a major proportion of such emulsion polymerization stabilizer is replaced by a sulfonium salt, as heretofore defined, in an amount of from about 0.1 percent to about 10 percent, preferably from about 0.5 percent to about 5 percent, based on the weight of the water-insoluble polymer in the dispersion.

To the latex, stabilized by a sulfonium salt of this invention, optionally may be added conventional ingredients with which latexes are commonly formulated such as pigments, extenders, plasticizers, coalescing aids, small amounts of organic solvents, and the like, provided that such ingredients are selected as are not incompatible with cationic dispersing agents.

The aqueous composition may then be coated, e.g., by spraying, brushing, rolling, or other suitable means, onto a substrate such as glass, fabric, wood metal or paper. The resulting coated material is subjected to conditions conductive to removal of water, i.e., elevated temperature, reduced pressure, a stream of dry air, or a combination of such means, until the composition is dry. The dried composition obtained thereby is heated at a temperature from about 95° C. to just below the decomposition temperature of the polymer comprising the composition for a time generally inverse to the temperature until a desired degree of water resistance is obtained, usually in the range of from about 5 minutes to about 3 hours.

The following examples illustrate the invention but are not to be construed as limiting the scope thereof. In the examples, parts and percentages are by weight unless otherwise noted.

*Example 1*

A 16-ounce citrate of magnesia bottle was charged with the following ingredients:

60 parts of styrene
40 parts of butadiene
150 parts of water
1 part of hydrogen peroxide
.0022 part of ferric nitrate
2 parts of dodecyl ethyl methyl sulfonium methyl sulfate
0.11 part of hydrochloric acid (as a 1 N solution)

After air was purged from the bottle with nitrogen, the bottle was capped and polymerization carried out by rotating the citrate bottle end-over-end in a water bath at 70° C. for 18 hours. From this procedure was obtained a latex having 38 percent solids and a particle size of 0.10 micron.

After the latex was steam distilled to remove residual monomers films were prepared by casting the latex on a glass microscope slide, 7.5 cm. x 2.5 cm., and allowing the water to evaporate at room temperature. After 24 hours at room temperature, the films were baked at 150° C. for 30 minutes then were conditioned over calcium chloride in a desiccator for 24 hours. The films obtained thereby were continuous and flexible. The water absorption of the baked films was measured by placing the glass slides having the baked films adhering thereto in deionized water and allowing them to soak for 120 hours at room temperature. The slides were then taken from the water bath, with the water adhering to the surface of the slide and film being removed by blotting. The percentage (by weight) of water absorbed was calculated, based on the weight of the dry film, and was found to be 2.3 percent.

*Example 2*

A latex was prepared from the following recipe:

150 parts of water
.005 part of the sodium salt of ethylenediaminetetraacetic acid
0.25 part of glacial acetic acid
0.3 part of sodium formaldehyde sulfoxylate
0.5 part of cumene hydroperoxide
2 parts of ar-dodecylbenzyldiethanol sulfonium chloride
50 parts of 2-ethylhexyl acrylate
50 parts of methyl methacrylate.

The equipment used for the polymerization was a flask fitted with a stirrer, a reflux condenser, a nitrogen inlet, a thermometer and a separatory funnel. All the ingredients except the monomers (the 2-ethylhexyl acrylate and the methyl methacrylate) were placed in the flask which was immersed in a water bath at 50° C. and the stirrer was started. The monomers were placed in the separatory funnel and about 20 parts of the monomer mixture was introduced into the flask. After 15 minutes, the remainder of the monomer mixture was allowed to drop into the flask at an approximately uniform rate over a period of one hour and forty minutes. Stirring was continued for an additional 30 minutes before allowing the contents of the flask to cool. There was obtained by this procedure a latex having 30 percent solids and an average particle diameter of 0.12 micron. A film prepared as described in Example 1 was soft and tacky after baking for 30 minutes at 150° C., and did not become cloudy when immersed in water.

*Examples 3–7*

Other latexes were prepared from a monomer mixture consisting of 60 percent of styrene and 40 percent of butadiene using the same procedure as in Example 1 except for the amount and/or kind of stabilizing agent and other specific exceptions noted below. Films were cast and the percentage of water absorbed was calculated as in Example 1. The kind and amount of stabilizing agent used for the different examples are shown in Table I, below, together with the respective water absorption data. Included also in Table I for comparison are results from Example 1 and from other latexes prepared from styrene and butadiene in the same ratio but using conventional emulsifiers rather than the sulfonium salts required for the practice of this invention.

TABLE I

| Ex. No. | Stabilizing Agent Kind | Amount, parts 100 parts of polymer | Water Absorbed in 120 Hrs., percent |
|---|---|---|---|
| 1 | Dodecylethylmethylsulfonium methyl sulfate | 2.0 | 2.3 |
| 3 | ----do---- | 7.0 | 5.2 |
| 4 | Dodecylethylmethylsulfonium chloride | 2.0 | 2.0 |
| 5 | ----do---- | 6.2 | 5.2 |
| 6 | ar-dodecylbenzyldiethanolsulfonium chloride | a 2.0 | 9.0 |
| 7 | ----do---- | a 5.0 | 7.1 |
| (*) | Sodium dihexyl sulfosuccinate | 1.5 | 14.3 |
| (*) | A mixture of conventional stabilizers including sodium lauryl sulfate, an alkyl aryl sulfonate, and a condensation product of ethylene oxide and a dibutyl phenol. | b 3.9 | 60 | a Catalyst system was 0.3 part of sodiumformaldehyde sulfoxylate and 0.5 part of cumene hydroperoxide.
b Catalyst was potassium persulfate.
*Not examples of this invention.

What is claimed is:
1. A method for preparing a water resistant polymeric product comprising the steps of
   (1) subjecting a polymerizable, non-ionic, ethylenically unsaturated monomeric material to conditions conducive to emulsion polymerization in aqueous media at a pH of from about 2 to about 8 and containing a dispersion stabilizer consisting essentially of a sulfonium salt having the formula

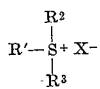

wherein R′ is a monovalent hydrocarbon radical of from 8 to 20 carbon atoms having an aliphatic carbon atom bonded to the sulfur; $R^2$ and $R^3$ are individually selected from the class consisting of alkyl groups having from 1 to 4 carbon atoms and monosubstituted alkyl groups of from 2 to 4 carbon atoms having a hydroxy substituent and a bond to the sulfur atom on different carbon atoms; and $X^-$ is a water-soluble anion having a nucleophilicity at least as great as about the nucleophilicity of the sulfate ion; whereby an aqueous colloidal dispersion of a water-insoluble polymer is obtained;
   (2) subjecting the colloidal dispersion obtained thereby to conditions conducive to removal of the water from said colloidal dispersion until a substantially dry product is produced;
   (3) heating the resulting substantially dry product at a temperature above about 95° C. and below the decomposition temperature of the water-insoluble polymer until a desired degree of water-resistance is obtained.

2. The method of claim 1 in which the sulfonium salt is present in an amount from about 0.1 percent to about 10 percent by weight, based on the weight of the water-insoluble polymer in the dispersion.

3. The method of claim 1 in which the sulfonium salt is present in an amount from about 0.5 percent to about 5 percent by weight, based on the weight of the water-insoluble polymer in the dispersion.

4. A method for preparing a water-resistant polymeric product comprising the steps of
   (1) subjecting a monomeric material selected from the group consisting of styrene and non-ionic monomers copolymerizable with styrene to conditions conducive to emulsion polymerization in aqueous media at a pH of from about 2 to about 8 and containing a dispersion stabilizer having the formula

wherein R′ is a monovalent hydrocarbon radical of from 8 to 20 carbon atoms having an aliphatic carbon atom bonded to the sulfur; $R^2$ and $R^3$ are individually selected from the class consisting of alkyl groups having from 1 to 4 carbon atoms and monosubstituted alkyl groups of from 2 to 4 carbon atoms having a hydroxy substituent and a bond to the sulfur atom on different carbon atoms; and $X^-$ is a water-soluble anion having a nucleophilicity at least as great as about the nucleophilicity of the sulfate ion; whereby there is formed a stable colloidal dispersion in water of a water-insoluble polymer;
   (2) subjecting the colloidal dispersion obtained thereby to conditions conducive to removal of the water of said colloidal dispersion until a substantially dry product is obtained;
   (3) heating the resulting substantially dry product at a temperature above about 95° C. and below the decomposition temperature of the water-insoluble polymer for a time generally inverse to the temperature of from about 5 minutes to about 3 hours.

5. The method of claim 4 in which the dispersion stabilizer is used in an amount from about 0.1 percent to about 10 percent by weight, based on the weight of the water-insoluble polymer in the dispersion.

6. A method for preparing a water-resistant self-supporting film comprising the steps of
   (1) subjecting a monomeric material selected from the group consisting of styrene and non-ionic monomers copolymerizable with styrene to conditions conducive to emulsion polymerization in aqueous media at a pH of from about 2 to about 8 and containing a dispersion stabilizer having the formula

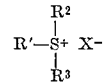

wherein R′ is a monovalent hydrocarbon radical of from 8 to 20 carbon atoms having an aliphatic carbon atom bonded to the sulfur; $R^2$ and $R^3$ are individually selected from the class consisting of alkyl groups having from 1 to 4 carbon atoms and monosubstituted alkyl groups of from 2 to 4 carbon atoms having a hydroxy substituent and a bond to the sulfur atom on different carbon atoms; and $X^-$ is a water-soluble anion having a nucleophilicity at least as great as about the nucleophilicity of the sulfate ion; whereby there is formed a stable colloidal dispersion in water of a water-insoluble polymer;
   (2) distributing a thin layer of the thus obtained colloidal dispersion on a substrate;
   (3) subjecting the thin layer of the colloidal dispersion obtained thereby to conditions conducive to removal of the water from said layer until a substantially dry film is obtained;

(4) heating the substantially dry film at a temperature above about 95° C. and below the decomposition temperature of the water-insoluble polymer until a desired degree of water-resistance is obtained.

7. The method of claim 6 in which the dispersion stabilizer is used in an amount from about 0.1 percent to about 10 percent by weight, based on the weight of the water-insoluble polymer in the dispersion.

References Cited

UNITED STATES PATENTS

| 2,121,823 | 6/1938 | Piggott | 260—607 |
| 3,028,361 | 4/1962 | Abrams et al. | 260—29.6 |
| 3,047,631 | 7/1962 | Rocklin | 260—607 |

SAMUEL E. BLECH, *Primary Examiner.*

MURRAY TILLMAN, *Examiner.*

J. ZIEGLER, *Assistant Examiner.*